United States Patent Office 3,029,207
Patented Apr. 10, 1962

3,029,207
PROCESS FOR PREPARING A CATALYST CONTAINING A METAL OF THE IRON GROUP
Albert C. Boucek, Gibsonia, George E. Elliott, Jr., Oakmont, and Meredith M. Stewart, Pittsburgh, Pa., assignors to Gulf Research & Development Company, Pittsburgh, Pa., a corporation of Delaware
No Drawing. Filed Mar. 28, 1958, Ser. No. 724,507
2 Claims. (Cl. 252—470)

This invention relates to procedure for preparing catalysts containing active metalliferous components selected from the group of molybdenum, vanadium and tungsten and in particular the preparation of catalysts containing such metalliferous components in conjunction with iron group metals or their compounds.

The preparation of catalysts containing metalliferous components of molybdenum, tungsten and vanadium has been a difficult problem because of the relative insolubility of the acidic compounds of these metals in water. This is particularly true in connection with catalysts containing both the above mentioned metalliferous components and metals or compounds of the iron group such as nickel, cobalt and iron.

This invention has for its object to provide improved procedure for preparing catalysts containing molybdenum, tungsten and/or vanadium. Another object is to provide improved procedure for preparing catalysts containing molybdenum, tungsten and/or vanadium in conjunction with a metalliferous component of the iron group. A particular object is to provide improved procedure for preparing a catalyst containing molybdenum and a member of the iron group. Other objects will appear hereinafter.

These and other objects of our invention are accomplished by forming an aqueous solution of an ammonium salt or of a substituted ammonium (amine) salt or of an alkali metal salt of an acid of molybdenum, tungsten or vanadium; contacting this salt solution with the hydrogen or protonated form of a cation exchange material; separating the aqueous solution after contact with the cation exchange material; impregnating a porous carrier with the solution separated from the protonated cation exchange material; and calcining the impregnated carrier.

We have found in accordance with our invention that contacting of the above mentioned metal salts with the protonated cation exchange material results in conversion of the metal salts into the corresponding metal acids by ion exchange and that the resultant dispersions or solutions may be employed to impregnate a catalyst carrier to yield catalysts of high activity.

The cation exchange resins used herein may be organic polymers of high molecular weight having acidic components such as sulfonic, carboxylic, phosphonic, phosphonous and/or phenolic groups incorporated in the structure. The organic ion exchange resins suitable as catalysts are the hydrogen or protonated form of cation exchange resins which are ordinary readily available products of commerce. The ion exchange resins suitable for use in this invention are usually shipped in a neutralized condition and must be treated with an acid prior to use. After acid treatment they ordinarily contain about 1 to 7 milli-equivalents of replaceable hydrogen ion per gram of the dry resin. Examples of ion exchange resins which can be used in this invention are sulfonated polystyrene resins which may be cross-linked with other compounds such as divinyl benzene, and phenol formaldehyde resins containing sulfonic groups. A carboxylic-type cation exchange resin suitable for use in this invention can be prepared by incorporating maleic anhydride into a copolymer of styrene and divinyl benzene and then hydrolyzing the resulting product. Another type of ion exchange resin which can be used in the protonated form is a sulfonated coal prepared by treating various bituminous coals with sulfur trioxide. We prefer to employ sulfonated polystyrene cation exchange resins.

Cation exchange resins are readily converted to the protonated form suitable for use in this invention. For example, Dowex 50, a resin of the nuclear sulfonic type, in the sodium form can be protonated by washing with water and then rinsing with an acid such as 3 volumes of 10 percent hydrogen chloride per volume of resin. After the acid rinse, the resin is rinsed with distilled water until the effluent is neutral.

As indicated above, any alkali metal (sodium, lithium, potassium, etc.) or ammonium salt of molybdenum, vanadium or tungsten may be employed. Also as indicated above, amine salts such as the tetramethyl ammonium hydroxide salt of molybdic acid or the trimethylamine salt of tungstic acid may be used. The ammonium, amine or alkali metal salts may be employed in any desired concentration including saturated solutions. The ammonium salts of vanadium and tungsten are generally of relatively low solubility in water. Therefore in connection with these metals, we prefer to employ aqueous solutions containing the alkali metal salts of these materials. When the salt to be used is insufficiently soluble to give the desired concentration in the impregnating solution, it is satisfactory to heat the solution to increase the solubility. Elevated temperatures and pressures may be employed to obtain the desired solubility and the resultant solution contacted with the cation exchange material under the same temperature and pressure. Any temperature and pressure below the decomposition or softening point of the cation exchange material may be used. The salts should be used in a concentration below that which yields an effluent that rapidly gels. Thus if too concentrated solutions of the sodium or potassium salts of vanadium or tungsten are employed, the resultant liquid after contacting with the cation exchange material will gel rapidly. However, this is not detrimental if the gel does not form before contacting with the carrier to be impregnated. If too high a concentration of the salts is employed, the gel will form within a few minutes after passage through or contact with the ion exchange material. Therefore with tungsten and vanadium alkali metal salts, we prefer to employ a concentration below about 10 percent. This concentration is ample for most catalyst preparation purposes. The molybdenum salts do not involve any difficulty in this regard and any concentration up to saturated solutions may be employed. Thus for instance ammonium paramolybdate is soluble in water at 30° C. in an amount of about 40 grams of salt per 100 grams of water. Sodium vanadate is soluble in a concentration of 25 grams of salt per 100 grams of water at 30° C. Both of these solutions have been passed through cation exchange resins to yield stable suspensions that did not gel. Of course less concentrated solutions may be used. After contacting with the cation exchange material, a solution is obtained containing approximately the same amount of metal as was introduced into contact with the cation exchange resin.

The contacting of the aqueous solution with the cation exchange material may be accomplished in any desired manner. The most convenient method is to form the cation exchange material in a packed or moving column and introduce the aqueous solution into one end of this column. The liquid solution flows through the column of cation exchange material, ion exchange takes place and the desired solution flows from the other end of the column and may be used without alteration for impregnation of catalyst carriers. When using this method of contacting, it will be found that in some cases the first portion of liquid coming out of the column will be too dilute, due to dilution with wash water in the column. (This wash water is present from the preceding regeneration.) In such event the first portions of liquid may be recycled to the column or the metal content recovered therefrom. An alternative contacting procedure which may be used but which is less satisfactory is to simply mix or slurry the solution and cation exchange material together followed by decantation or filtration. The most satisfactory impregnating solution is obtained by recycling or discarding the initial and final portions of the liquid flowing through the column of ion exchange material, i.e. using a "heart cut" for the impregnating solution.

The solution flowing from the column can be employed for catalyst preparation until the first signs of precipitation appear. Thereafter the ion exchange resin is regenerated. The time for regeneration can be determined by a pH meter positioned to read the pH of the liquid flowing from the column. With ammonium paramolybdate, regeneration is required when the effluent reaches a pH of 3–4, with sodium tungstate a pH of about 1.5 and with sodium vanadate a pH of about 3. The liquid flowing from the cation exchange material in general should have a pH of below about 4. The pH range of the impregnating solution flowing from the column is about 0.5 to 3.0 with ammonium paramolybdate; with sodium tungstate about 1 to 1.5; and sodium vanadate about 2 to 3.0. It will be apparent that the pH of the effluent will vary depending on the salt used.

The cation exchange material may be regenerated after the solution has been contacted to an extent sufficient to exhaust the hydrogen ions. The time at which regeneration is required can be determined if the acid equivalents of the exchange resin and of the solution to be exchanged are known. From this can be calculated the weight of resin required for the exchange of the desired amount of solution. Alternatively the use of a pH meter as described above may be preferred. Regeneration is accomplished by washing thoroughly with water to remove the metal salts still in the column. Thorough washing is advisable since the subsequent treatment with acid will cause insoluble metal salts to precipitate if the metalliferous compounds are still present in the cation exchange material. This would result in plugging of the cation exchange material. After thorough washing the resin is regenerated by passing a dilute non-oxidizing acid solution such as sulfuric, hydrochloric, acetic, or phosphoric acid through the column. An acid concentration below about 50 percent and preferably about 5 to 10 percent is employed. A satisfactory regeneration is obtained by washing with about 5 percent sulfuric acid in amount of 1.7 to 2.5 volumes per volume of ion exchange material. After a second wash step to remove any excess acid, the cation exchange material may be used again for preparing the impregnating solution as described above.

After contacting with the cation exchange material as described above, the aqueous solution is employed in the conventional manner to impregnate a catalyst carrier with the metalliferous component. Vacuum impregnation, impregnation at ordinary pressures or any other conventional impregnating procedure may be employed. In other words the solution prepared by contacting with the cation exchange material is effective as an impregnating solution in the same way that any other aqueous metal salt impregnating solution is conventionally used. The solution may be employed to deposit the mentioned metal components on porous carriers in general such as activated alumina, silica-alumina, activated clays, diatomaceous earth, magnesia, silica-magnesia, silica gel, "Alfrax," etc. After impregnation the catalyst is calcined in conventional fashion, i.e. at a temperature of about 800°–1400° F., usually after drying.

The preparation of catalysts containing both a member of the group consisting of molybdenum, tungsten, and vanadium metalliferous components and at least one metal or compound of a metal of the iron group, i.e. iron, cobalt or nickel is known to be a difficult problem. In order to derive full activity from both metalliferous components, it is desirable to deposit them simultaneously. This necessitates an aqueous solution containing both metal components in a solution in a sufficiently stable form to result in uniform impregnation. The present invention enables this to be accomplished since the cation exchanged solution is compatible with an aqueous salt of a metal of the iron group without forming a precipitate. Therefore after passage of the solution through the cation exchange material in the manner described above, an aqueous solution of a water-soluble salt of the iron group metal such as the acetate, nitrate, etc. may be added to the aqueous solution without affecting the solubility of the metal compound already present and without precipitation of either salt. If desired the crystalline iron group metal salt may be added instead of the aqueous solution, i.e. the crystalline iron group metal salt does not cause precipitation of the ion exchanged solution. This stable solution then contains both the molybdenum, tungsten and/or vanadium component as well as one or more of the iron group metal components and may be contacted with a porous carrier to uniformly deposit both the molybdenum, etc. component as well as one or more of the iron group components.

The catalysts prepared in accordance with our invention have high activity and may be used in any process in which such catalysts are ordinarily employed. For instance these catalysts have excellent activity when employed in hydrodesulfurization processes. Thus for instance they may be used to hydrodesulfurize petroleum fractions such as furnace oil, whole or reduced crude, a charge stock for hydrogen reforming, etc. These catalysts are also well suited for refining of lubricating oils by treatment with hydrogen in well known manner. These catalysts are also of value for dehydrogenation of organic substances. Thus for instance they may be employed to reform naphtha in the presence of hydrogen in the conventional fashion.

EXAMPLE

A catalyst (catalyst A) was prepared utilizing the procedure of the present invention. The preparation involved dissolving ammonium paramolybdate in water to form a saturated solution ($MoO_3$ concentration of 20 percent). 420 ml. of this ammonium paramolybdate solution were passed through 407 ml. of "Nalcite HCxR8" in the hydrogen form to obtain a molybdic acid solution containing approximately the same amount of molybdenum as the charge solution. The pH of the effluent was about 1.0. The 244 ml. of molybdic acid solution thus prepared was added to an aqueous solution prepared by mixing 22.5 grams $Co(NO_3)_2 \cdot 6H_2O$, 14.1 grams $Ni(NO_3)_2 \cdot 6H_2O$ with 49.0 grams of distilled water. The resultant solution contained 1.017 percent NiO, 1.623 percent CoO and 13.00 percent $MoO_3$. This solution was used to impregnate 147.3 grams of activated "Filtrol 86" alumina extrusions which had been calcined at 1200° F. for 5 hours followed by cooling to room temperature. The impregnation was accomplished under vacuum conditions. This quantity of alumina absorbed 116.0 ml. of the solution. The wet material was dried at 250° F. for 24 hours and calcined at 900° F. for 13 hours.

A second catalyst (catalyst B) was prepared by vacuum impregnation of the same "Filtrol 86" carrier utilizing a single impregnation technique known in the art and involving dissolving 82.4 grams of ammonium paramolybdate in 108 grams of aqueous ammonia (28.0 percent $NH_3$ by weight). To this was added 13.6 grams of nickel nitrate $Ni(NO_3)_2 \cdot 6H_2O$ and 27.3 grams cobalt nitrate $Co(NO_3)_2 \cdot 6H_2O$. 334 ml. of the resultant solution were added to 492.8 grams of the "Filtrol 86" alumina under the same vacuum impregnation conditions utilized in connection with catalyst A. The 492.8 grams of activated alumina absorbed 334 ml. of the solution. The wet material was dried at 250° F. for 24 hours and calcined at 900° F. for 13 hours.

Catalyst A and B were employed to hydrodesulfurize a Kuwait furnace oil (416°–640° F.) having a gravity of 24.3° API, 27.7 bromine number, and containing 1.55 percent sulfur and 59.5 percent aromatics. The conditions of the hydrodesulfurization and the results obtained are shown in the accompanying table.

Table

|  | Catalyst A | Catalyst B |
| --- | --- | --- |
| Support | Filtrol 86 | Filtrol 86. |
| Preparation technique | Single impreg., ion exchange | Single impreg., ammoniacal. |
| Metals content, percent: |  |  |
| Mo | 8.16 | 7.92. |
| Co | 0.94 | 0.90. |
| Ni | 0.62 | 0.47. |
| Reaction conditions: |  |  |
| Temperature, °F | 661 | 649. |
| Pressure, p.s.i.g | 610 | 610. |
| Space velocity (LHSV) | 4.02 | 4.04. |
| SCF-H₂/bbl | 3,790 | 3,550. |
| Throughput | 48.3 | 48.5. |
| Product, percent: |  |  |
| Sulfur | 0.15 | 0.21. |
| Desulfurization | 90.3 | 86.5. |

We claim:
1. The process which comprises forming an aqueous solution of a salt selected from the group consisting of alkali metal, amine and ammonium salts of acids of molybdenum, vanadium and tungsten, contacting the resultant aqueous solution with a protonated cation exchange material, separating the aqueous solution from the cation exchange material, adding a water-soluble salt of a metal of the iron group to the aqueous solution and impregnating a porous catalyst carrier with the resultant aqueous solution.

2. The process which comprises contacting an aqueous solution of ammonium paramolybdate with a protonated cation exchange material, separating the aqueous solution from the cation exchange material, adding aqueous cobalt nitrate to the ion exchanged aqueous solution, impregnating a porous catalyst carrier with the aqueous solution, drying and calcining the impregnated carrier.

References Cited in the file of this patent
UNITED STATES PATENTS

| | | |
|---|---|---|
| 2,215,095 | Drossbach | Sept. 17, 1940 |
| 2,739,132 | Riedl | Mar. 20, 1956 |
| 2,753,310 | Riedl | July 3, 1956 |
| 2,754,325 | Smith | July 10, 1956 |
| 2,870,171 | Gable | Jan. 20, 1959 |